US012589500B2

(12) United States Patent
Londenberg et al.

(10) Patent No.: US 12,589,500 B2
(45) Date of Patent: Mar. 31, 2026

(54) METHOD AND DEVICE FOR ANNOTATING IMAGES OF AN OBJECT CAPTURED USING A CAMERA

(71) Applicant: Volkswagen Aktiengesellschaft, Wolfsburg (DE)

(72) Inventors: Kai Londenberg, Hannover (DE); Zsolt Farkas, Wolfsburg (DE); Daniel Schulze, Braunschweig (DE); Maxim Derksen, Wolfsburg (DE); Lisa Rangosch, Königslutter (DE); Peter Motzko, Schöppenstedt (DE); Robert Schirmer, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 181 days.

(21) Appl. No.: 18/555,693

(22) PCT Filed: Mar. 24, 2022

(86) PCT No.: PCT/EP2022/057763
§ 371 (c)(1),
(2) Date: Oct. 16, 2023

(87) PCT Pub. No.: WO2022/218670
PCT Pub. Date: Oct. 20, 2022

(65) Prior Publication Data
US 2024/0198535 A1 Jun. 20, 2024

(30) Foreign Application Priority Data
Apr. 16, 2021 (DE) .......................... 102021203779.8

(51) Int. Cl.
*B25J 9/16* (2006.01)
*G06T 7/80* (2017.01)

(52) U.S. Cl.
CPC ............. *B25J 9/1692* (2013.01); *B25J 9/161* (2013.01); *G06T 7/80* (2017.01); *B25J 9/1687* (2013.01);
(Continued)

(58) Field of Classification Search
None
See application file for complete search history.

(56) References Cited

U.S. PATENT DOCUMENTS 7,818,091 B2 10/2010 Kazi et al.
9,916,506 B1 3/2018 Davis
(Continued)

FOREIGN PATENT DOCUMENTS

CN 106920261 A 7/2017
CN 108597036 A 9/2018
(Continued)

OTHER PUBLICATIONS

PCT/EP2022/057763. International Search Report (Jul. 15, 2022).
(Continued)

*Primary Examiner* — Wade Miles
*Assistant Examiner* — Arslan Azhar
(74) *Attorney, Agent, or Firm* — Peter Zura; LOZA & LOZA, LLP

(57) ABSTRACT

Technologies and techniques for annotating images of an object captured using a camera, wherein the camera is positioned on a robot arm, and wherein the robot arm includes an end effector. A position and an orientation of the camera is determined, relative to the end effector, and a first keypoint is selected on the object. Information regarding additional keypoints relative to the first keypoint is provided in object coordinates, and the end effector is guided to the position of the first keypoint. The position and the orientation of the end effector is determined at the first keypoint, (Continued)

and based on other determined world coordinates, the position and/or the orientation of the end effector is changed based on converted camera image coordinates.

20 Claims, 5 Drawing Sheets

(52) U.S. Cl.
CPC .............. *G06T 2207/20081* (2013.01); *G06T 2207/20084* (2013.01); *G06T 2207/30204* (2013.01); *G06T 2207/30244* (2013.01)

(56) References Cited

U.S. PATENT DOCUMENTS

| | | | | |
|---|---|---|---|---|
| 2003/0144765 | A1* | 7/2003 | Habibi | ................... G06T 1/0007 |
| | | | | 700/259 |
| 2016/0354929 | A1* | 12/2016 | Ishige | .................... B25J 9/1697 |
| 2020/0327353 | A1 | 10/2020 | Zhou et al. | |
| 2021/0086364 | A1 | 3/2021 | Handa et al. | |
| 2021/0402613 | A1 | 12/2021 | Eckardt | |
| 2022/0284626 | A1* | 9/2022 | Huang | .................... G01S 17/89 |

FOREIGN PATENT DOCUMENTS

| | | | |
|---|---|---|---|
| CN | 111360780 | A | 7/2020 |
| CN | 111862048 | A | 10/2020 |
| DE | 10345743 | A1 | 5/2005 |
| DE | 102005051533 | A1 | 8/2006 |
| DE | 102020102350 | A1 | 7/2020 |
| DE | 102019106458 | A1 | 9/2020 |
| WO | 2003064116 | A2 | 8/2003 |
| WO | 2017201023 | A1 | 11/2017 |

OTHER PUBLICATIONS

Priority German Application No. 102021203779.8. Examination Report (Nov. 4, 2023).

Kiyokawa et al. "Robotic waste sorter with agile manipulation and quickly trainable detector." IEEE Access vol. 9, pp. 124616-124631 (2021).

De Gregorio, et al. "Semiautomatic labeling for deep learning in robotics." IEEE Transactions on Automation Science and Engineering, vol. 17, No. 2, pp. 611-620 (Apr. 2020).

Corresponding CN Application No. 202280028470.1. First Office Action (Dec. 3, 2025).

Kiyokawa et al. Robotic waste sorter with agile manipulation and quickly trainable detector. Olin Library Cornell University Ithaca, NY 14853, (Apr. 2, 2021). (A slightly different iteration of this reference was cited in the corresponding International Search Report as IEEE Access vol. 9, pp. 124616-124631 (2021) and previously provided).

* cited by examiner

METHOD AND DEVICE FOR ANNOTATING IMAGES OF AN OBJECT CAPTURED USING A CAMERA

RELATED APPLICATIONS

The present application claims priority to International Patent Application No. PCT/EP2022/057763 to Londenberg, et al., filed Mar. 24, 2022, titled "Method And Device For Annotating Images Of An Object Captured Using A Camera," which claims priority to German Pat. App. No. 10 2021 203 779.8 filed Apr. 16, 2021, to Londenberg, et al., the contents of each being incorporated by reference in their entirety herein.

TECHNICAL FIELD

Aspects of the present disclosure are directed to a method and to a device for annotating images captured using a camera.

BACKGROUND

It is known from the prior art to manually annotate images of an object captured using a camera. In detail, the coordinates of several previously established points on the object are determined and identified by the person on the images. Alternatively, markers can be applied to corresponding points on the object so as to be able to recognize and identify these on the images. This, however, results in an alteration of the starting conditions since the object was altered by the application of the marker.

SUMMARY

Accordingly, technologies and techniques are disclosed to automate the annotation of images captured by means of a camera.

In some examples, methods are disclosed for annotating images of an object captured using a camera, wherein the camera is arranged on a robot arm, and wherein the robot arm comprises an end effector.

In some examples, a method may comprise determining a position and an orientation of the camera relative to an end effector. The camera may include a camera coordinate system. The robot arm, which is preferably arranged at a movable robot, includes the end effector. The end effector may be configured at the free end of the robot arm, e.g., the last link of the robot arm, which can in particular encompass a gripper arm. In humanoid robots, an end effector can be a hand, for example. The world coordinates of the end effector are known, wherein the relation between the world coordinates of the end effector and the camera is determined by calculating a position and an orientation of the camera relative to the end effector. In other words, a relationship is established between the world coordinate system and the camera coordinate system.

In some examples, a device is disclosed for annotating images of an object captured using a camera, wherein the device is configured to carry out the above-described method. For this purpose, the device comprises an evaluation unit and a control unit. The control unit is used to activate the robot arm and/or the robot and/or the camera. The evaluation unit is used to determine a position and an orientation of the camera relative to the end effector, to select a first keypoint on the object, to evaluate provided information regarding the relative positions of the additional keypoints with respect to the first keypoint, to determine the position and the orientation of the end effector at the first keypoint in world coordinates, to determine the position of the first keypoint as well as of the additional keypoints in world coordinates, to ascertain camera coordinates of the keypoints by converting the world coordinates of the keypoints into a camera coordinate system of the camera, and to determine camera image coordinates of all keypoints by means of projection from the camera coordinates thereof to identify the same. The device can furthermore comprise a memory unit for storing the image and the ascertained camera image coordinates of the keypoints.

In some examples, the device comprises the robot arm, which in turn comprises the end effector, and a camera. The device can furthermore comprise the robot, which comprises the robot arm.

DETAILED DESCRIPTION

Figure 1:
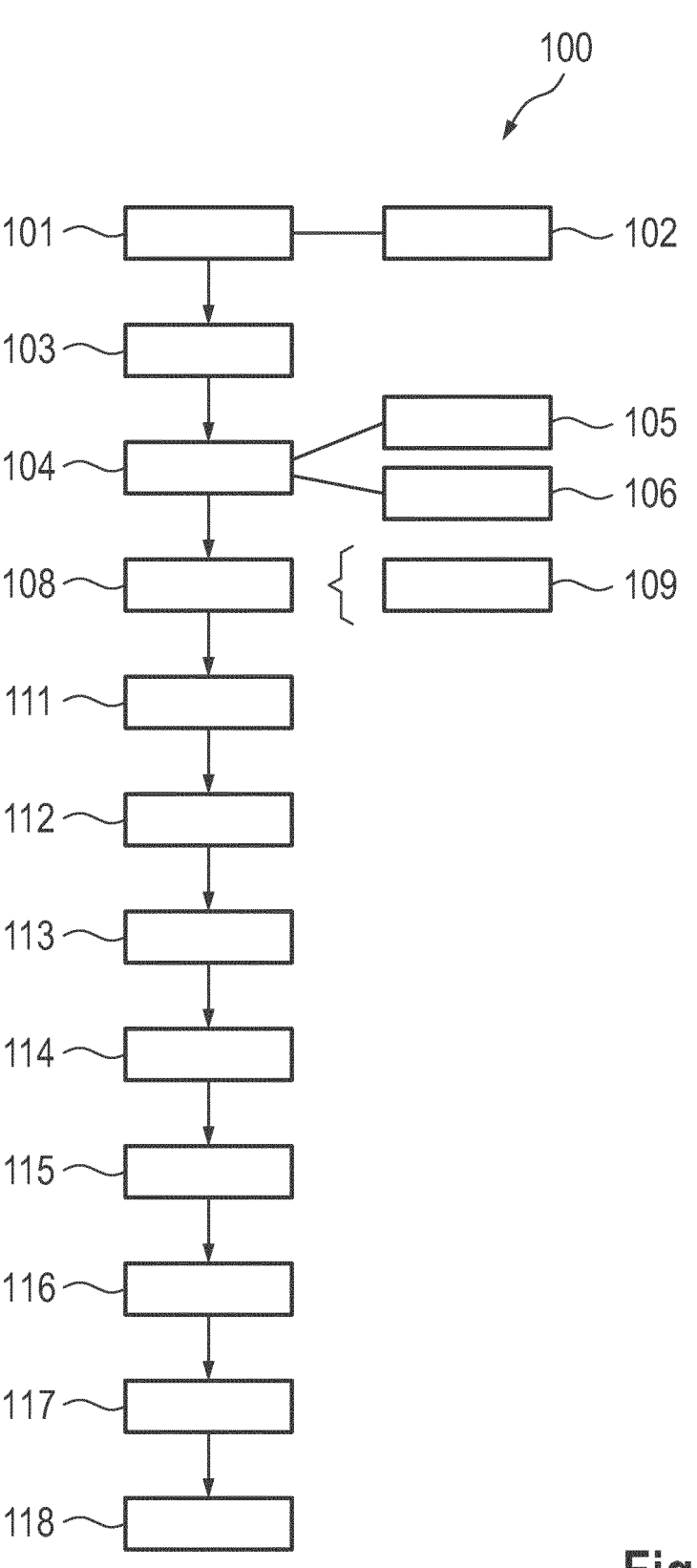
FIG. 1 illustrates a schematic diagram for a method according to some aspects of the present disclosure.

The determination of a position and an orientation of a camera relative to an end effector as described herein may comprise a hand-eye calibration. In particular, a calibration object is used in the process, for example an image having a checkerboard pattern. This calibration object is captured by means of the camera from different positions and from different orientations of the camera. The captured images are stored together with the different positions and orientations. Since the design of the calibration object, in the case of the checkerboard pattern, for example, the exact pattern thereof and the dimensions of the individual square surfaces, is known, it is possible to determine a connection between the position and orientation of the end effector and the camera perspective, in other words the camera coordinate system. It is thus possible to derive the world coordinates of the camera in the world coordinate system. The camera can thus be extrinsically calibrated. In some examples, it is also possible to ascertain optical errors of the camera in the manner described above. A distortion of the lens can be recognized, for example, by a distortion of the depicted calibration object on a captured image. The camera can thus also be intrinsically calibrated since the depiction is dependent on optical errors, for example lens distortions.

In some examples, the method comprises selecting a first keypoint on the object. The first keypoint is freely selected. The method furthermore comprises providing information regarding additional keypoints relative to the first keypoint in object coordinates, that is, in other words, in an object coordinate system. The keypoints are thus previously defined points at the object.

The provision of this information encompasses measuring the respective positions of the additional keypoints with respect to the first keypoint at the object. This can, for example, encompass manually measuring the respective relative positions of the additional keypoints with respect to the first keypoint. The method can furthermore comprise utilizing existing information regarding dimensions of the object. Based on the existing information, for example based on technical drawings or dimensions from DIN standards, it is possible to ascertain the relative positions.

In some examples, the method comprises guiding the end effector to the position of the first keypoint. In other words, the end effector is brought to the exact position of the first keypoint.

The guidance to the position of the first keypoint in particular encompasses manually moving the end effector to the first keypoint.

The end effector may be configured as a plug, with the object being a socket. The plug may be inserted into the socket, and the end effector can thus be guided to the first keypoint. The robot may be configured as a mobile charging robot.

In some examples, the method comprises determining the position and the orientation of the end effector at the first keypoint in world coordinates. From these, it is possible to infer the world coordinates of the first keypoint. Since the position and the orientation of the end effector in world coordinates are known, or can be determined in a simple manner after a movement of the robot and/or of the robot arm, the position of the first keypoint can be read out. In particular, it has previously been established exactly which location of the end effector will be guided to the first keypoint, wherein it is known where this location is situated at the end effector, so that the world coordinates thereof are also known at all times or can be derived after a corresponding movement of the robot arm or of the robot. The world coordinates at this location then correspond to the world coordinates of the first keypoint.

Since the relative position of the additional keypoints relative to the first keypoint is present in the form of object coordinates, it is possible, based on the determined position of the first keypoint in the form of world coordinates, to determine the position of the additional keypoints in world coordinates.

In a next step, the method comprises altering the position and/or the orientation of the end effector and capturing an image by means of the camera. The image is present in 2D and includes a 2D camera image coordinate system. The method can comprise converting the world coordinates of the keypoints into the camera coordinate system of the camera. In this way, camera coordinates, in other words 3D camera coordinates, of the keypoints are determined. In other words, the positions of the keypoints relative to the camera are determined. This step is carried out utilizing the relationship between the world coordinate system and the camera coordinate system, which was previously determined.

In a further step, the method comprises determining camera image coordinates, in other words 2D camera image coordinates, of all keypoints by means of projection from the camera coordinates thereof. In other words, camera image coordinates of all keypoints in the captured image are determined from the 3D camera coordinates by means of projective geometry. In a further step, the determined positions can be identified on the image. In this way, the captured image is annotated.

The term "annotating" as used herein should be understood to mean identifying previously defined points, in other words the keypoints, in the captured image. The present methods provide an automated keypoint annotation method so that a manual identification of keypoints on images is unnecessary. The methods thus do not encompass manually identifying keypoints on captured images. A manual identification shall in particular be understood to mean manually annotating the images. With respect to a manual annotation, the present methods have the advantage that human errors are avoided, and images can be very effectively annotated in very high numbers. In particular, the method also does not comprise applying markings to the object so as to recognize keypoints on captured images.

In some examples, the method can include storing the determined camera image coordinates of all keypoints. In particular, the steps between altering the position and/or the orientation of the end effector and capturing an image by means of the camera and determining camera image coordinates of all keypoints, above all including storing the determined camera image coordinates, are carried out repeatedly so as to generate a multitude of annotated images. In this way, in particular training data for an artificial network can be created, the training data being the annotated images. For example, training data for a mobile charging robot can be created, which, for example, is to autonomously charge a vehicle, so as to train the neural network in such a way that the mobile charging robot is able to guide the end effector, in other words the plug, fully automatically into the socket of the vehicle.

Turning to FIG. 1, the drawing illustrates a sequence of a method 100 according to the present disclosure, which, as the first step, comprises determining 101 a position and an orientation of the camera 14 relative to the end effector 13. This step can include a hand-eye calibration 102.

The method furthermore comprises selecting 103 a first keypoint 20 on the object 30, of which images are to be captured. The method 100 furthermore comprises providing 104 information regarding additional keypoints relative to the first keypoint 20 in object coordinates. The provision 104 can encompass measuring 105 the position of the additional keypoints relative to the first keypoint 20 at the object 30 or utilizing 106 existing information regarding dimensions of the object 30.

The method 100 may also include guiding the end effector 13 to the position of the first keypoint. This can in particular encompass manually moving 109 the end effector 13 to the first keypoint 20.

The method 100 may also include determining 111 the position and the orientation of the end effector 13 at the first keypoint 20, and determining 112 the position of the first keypoint in world coordinates as well as determining 113 the position of the additional keypoints in world coordinates.

The method 100 may also include altering 114 the position and/or the orientation of the end effector 13 and capturing an image 31 by means of the camera 14. By converting the world coordinates of the keypoints into the camera coordinate system of the camera 14, the camera coordinates of the keypoints can be determined 115. By means of projection, camera image coordinates of all keypoints can be determined from the camera coordinates and identified 116 on the image. The camera image coordinates of all keypoints are preferably stored 117. Steps 114 to 117 are in particular repeatedly carried out so that, in this way, a plurality of annotated images are created 118 as training data for a favorable network.

Figure 2:
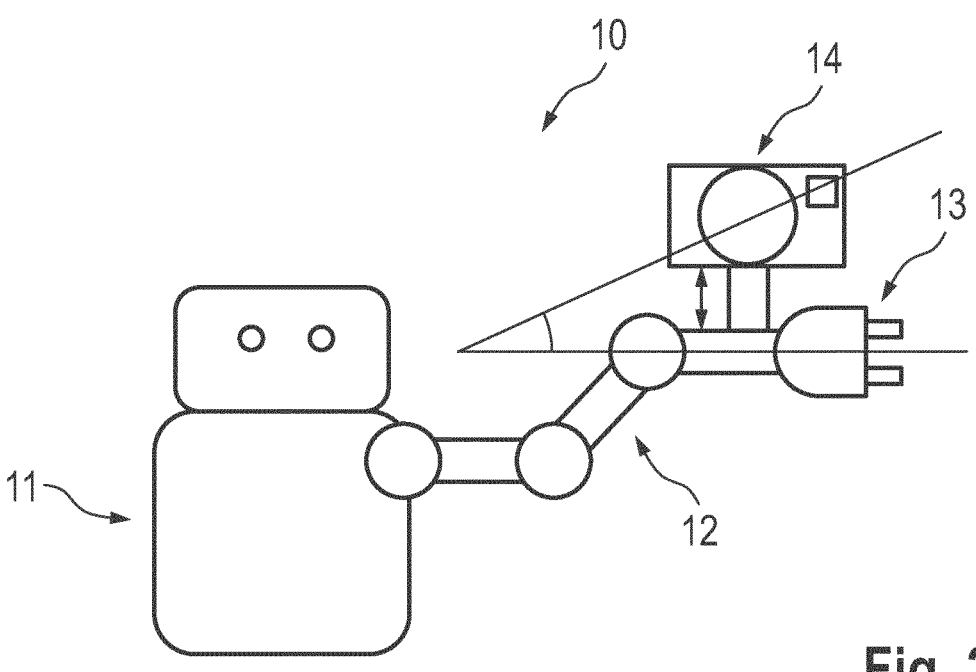
FIGS. 2 to 8 show different method steps of the method according to some aspects of the present disclosure.

FIG. 2 shows the step of determining 101 a position and an orientation of the camera 14 of a device 10 according to the invention relative to the end effector 13. The end effector 13 is arranged on a robot arm 12 of a robot 11.

Figure 3:
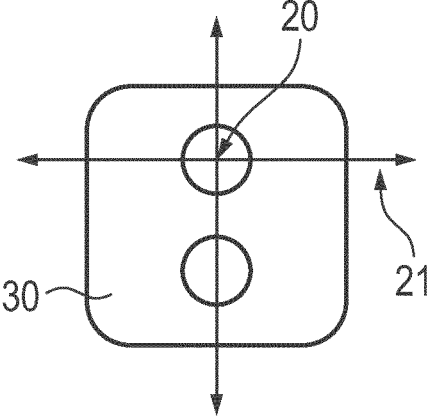

FIG. 3 shows how a first keypoint 20 is selected 103 in an object coordinate system 21 on an object 30. In this example, the first keypoint 20 is the center of the upper opening of the socket, which is the object 30.

Figure 4:
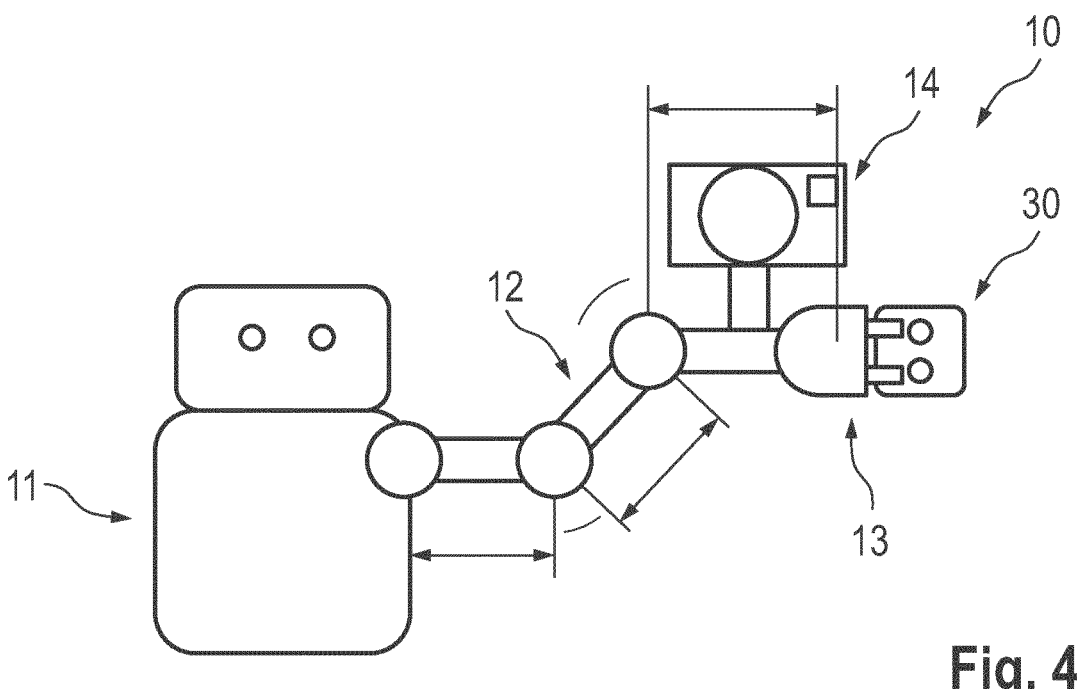

FIG. 4 shows how, by incrementally moving 109 the robot arm 12 to the object 30 and the first keypoint 20, the end effector 13 is guided to the position of the first keypoint 20. In this example, the end effector 13 is designed as a plug including two contact pins, wherein the upper contact pin is inserted into the upper opening of the socket in FIG. 4. The central location at the fixed end of the upper contact pin is the location of the end effector which is situated at the first keypoint when the plug is inserted in the socket. Since the world coordinates thereof are known, the world coordinates of the first keypoint 20 are determined in this way.

Figure 5:
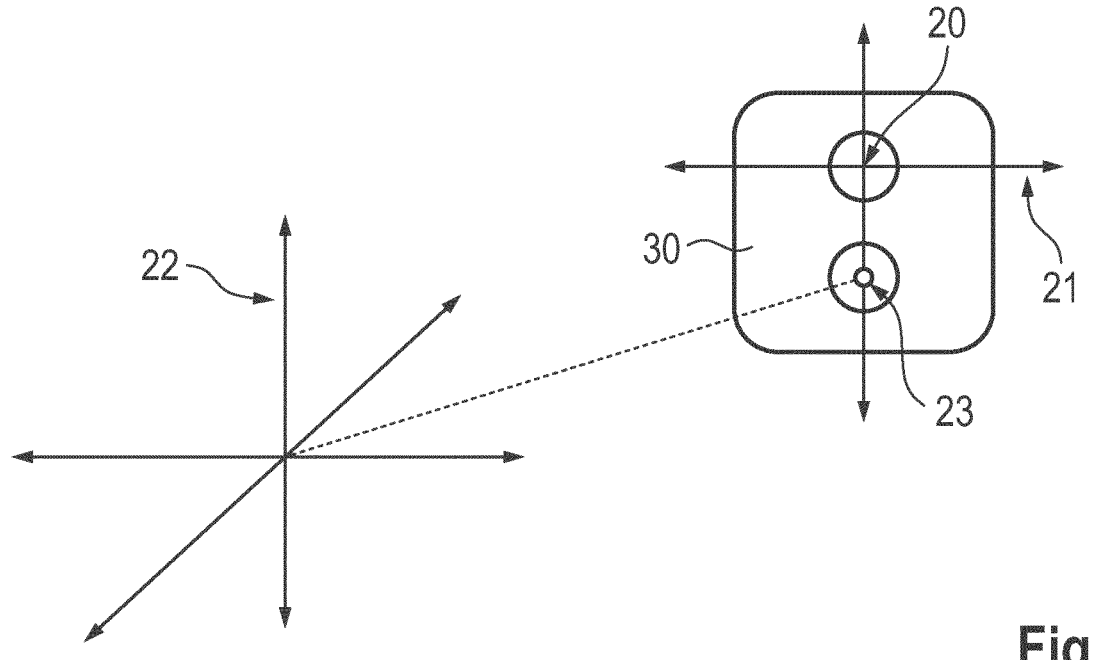

FIG. 5 shows how the positions of the additional keypoints are determined 113 in world coordinates. By way of example, a second keypoint 23 and the conversion thereof into the world coordinate system 22 based on the information regarding the relative position with respect to the first keypoint 20 are shown.

Figure 6:
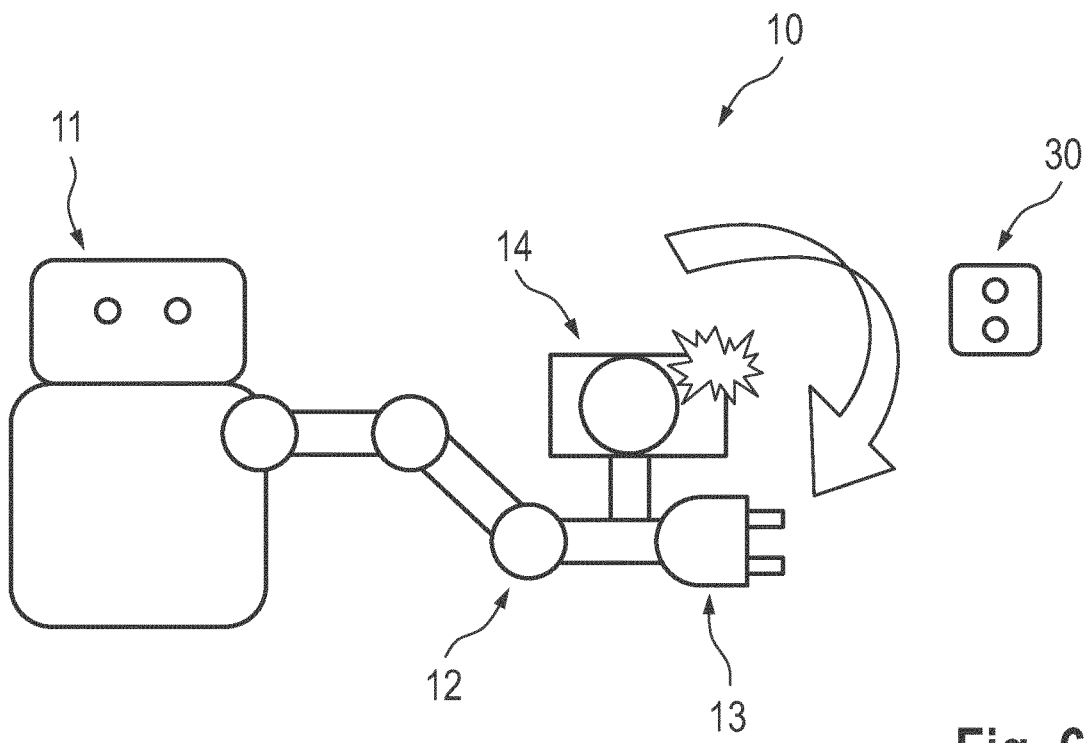

FIG. 6 shows how the position and the orientation of the end effector 13 is altered 114, and an image of the object 30 is captured 114 by means of the camera.

Figure 7:
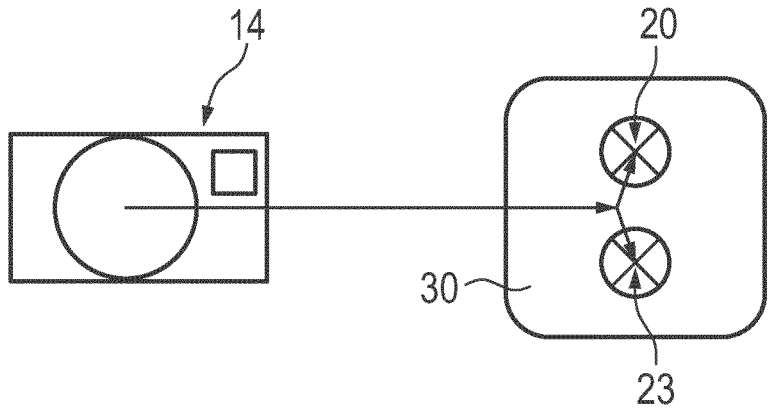

FIG. 7 schematically shows how camera coordinates of the keypoints are determined 115. In other words, the positions of the keypoints relative to the camera are determined 14.

Figure 8:
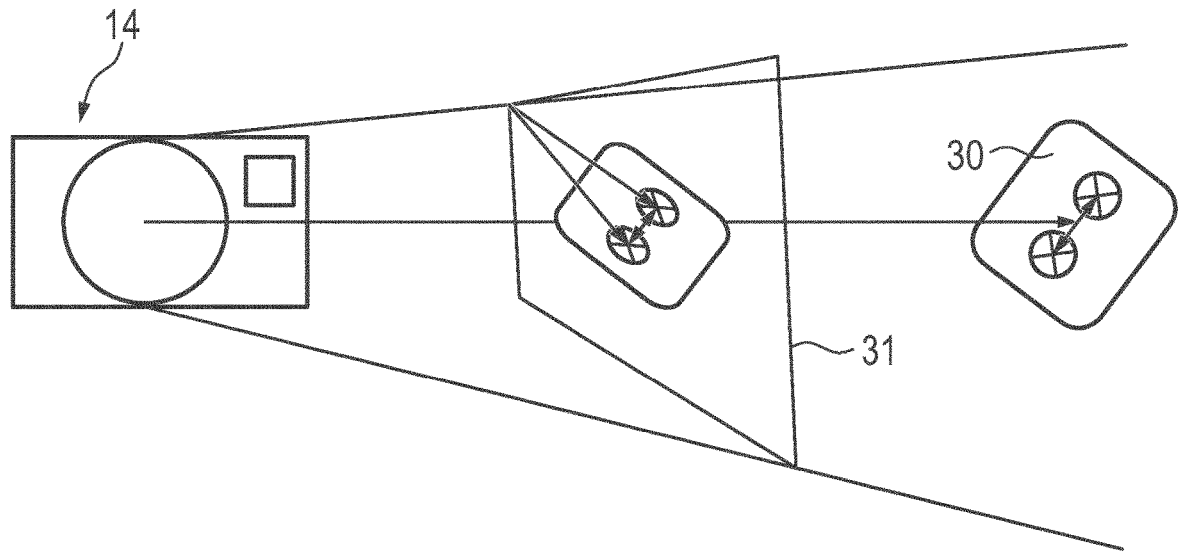

FIG. 8 shows how camera image coordinates of the keypoints are determined 116 by means of projection from the camera coordinates thereof. It is shown purely schematically how the camera image coordinates of the keypoints in an image 31 captured by means of the camera 14 are determined by means of projective geometry from the camera coordinates of the keypoints shown on the right.

LIST OF REFERENCE NUMERALS

100 method
101 determining a position and an orientation of the camera relative to the end effector
102 hand-eye calibration
103 selecting a first keypoint on the object
104 providing information regarding additional keypoints relative to the first keypoint in object coordinates
105 measuring the positions of the additional keypoints with respect to the first keypoint
106 utilizing existing information regarding dimensions of the object
108 guiding the end effector to the position of the first keypoint
109 manually moving the end effector to the first keypoint
111 determining the position and the orientation of the end effector at the first keypoint in world coordinates
112 ascertaining the position of the first keypoint in world coordinates
113 ascertaining the positions of the additional keypoints in world coordinates
114 altering the position and/or the orientation of the end effector and capturing an image by means of the camera
115 ascertaining camera coordinates of the keypoints by converting the world coordinates of the keypoints into a camera coordinate system of the camera
116 determining camera image coordinates of all keypoints by means of projection from the camera coordinates thereof and identification thereof
117 storing the camera image coordinates of all keypoints
118 creating training data within the meaning of annotated images for an artificial network
10 device
11 robot
12 robot arm
13 end effector
14 camera
20 first keypoint

21 object coordinate system
22 world coordinate system
23 second keypoint
30 object
31 image

The invention claimed is:

1. A method for automated generation of ground-truth data for image annotation captured using a camera, the camera being configured on a robot arm comprising an end effector, the method being performed by a processing apparatus operatively coupled to the camera and the robot arm, comprising:
    operating the robot arm and camera system to determine a position and an orientation of the camera relative to the end effector;
    selecting a first keypoint on the object;
    providing information regarding additional keypoints relative to the first keypoint in object coordinates;
    physically guiding the end effector to the position of the first keypoint;
    determining the position and the orientation of the end effector at the first keypoint in world coordinates;
    determining the position of the first keypoint in world coordinates;
    determining the positions of the additional keypoints in world coordinates;
    altering the position and/or the orientation of the end effector and capturing an image via the camera;
    determining camera coordinates of the keypoints by converting the world coordinates of the keypoints into a camera coordinate system of the camera; and
    determining camera image coordinates of all keypoints using projection from the camera coordinates thereof, whereby the images are annotated without requiring physical markers or manual identification of keypoints.

2. The method according to claim 1, further comprising not manually identifying keypoints on images captured by means of the camera.

3. The method according to claim 1, further comprising not applying markings on the object so as to recognize keypoints on the captured image.

4. The method according to claim 1, wherein the determining of a position and of an orientation of the camera relative to the end effector comprises a hand-eye calibration.

5. The method according to claim 1, wherein the providing of information regarding additional keypoints comprises measuring the respective positions of the additional keypoints with respect to the first keypoint at the object.

6. The method according to claim 1, wherein the providing of information regarding additional keypoints comprises utilizing existing information regarding dimensions of the object.

7. The method according to claim 1, wherein the guiding the end effector to the position of the first keypoint comprises manually moving the end effector to the first keypoint.

8. The method according to claim 1, further comprising generating training data for an artificial network comprising the annotated images.

9. A device for annotating images of an object, comprising:
    a robot arm comprising an end effector;
    a camera configured to capture images, the camera being configured on the robot arm;
    a processing apparatus, operatively coupled to the camera, the processing device being configured to
        determine a position and an orientation of the camera relative to the end effector;

select a first keypoint on the object;

provide information regarding additional keypoints relative to the first keypoint in object coordinates;

guide the end effector to the position of the first keypoint;

determine the position and the orientation of the end effector at the first keypoint in world coordinates;

determine the position of the first keypoint in world coordinates;

determine the positions of the additional keypoints in world coordinates;

alter the position and/or the orientation of the end effector and capturing an image via the camera;

determine camera coordinates of the keypoints by converting the world coordinates of the keypoints into a camera coordinate system of the camera; and determine camera image coordinates of all keypoints using projection from the camera coordinates thereof.

10. The device according to claim 9, wherein the processing apparatus is configured to not manually identify keypoints on images captured via the camera.

11. The device according to claim 9, wherein the processing apparatus is configured to not apply markings on the object so as to recognize keypoints on the captured image.

12. The device according to claim 9, wherein the processing apparatus is configured to determine a position and of an orientation of the camera relative to the end effector using a hand-eye calibration.

13. The device according to claim 9, wherein the processing apparatus is configured to provide information regarding additional keypoints by measuring the respective positions of the additional keypoints with respect to the first keypoint at the object.

14. The device according to claim 9, wherein the processing apparatus is configured to provide of information regarding additional keypoints comprises utilizing existing information regarding dimensions of the object.

15. The device according to claim 9, wherein the processing apparatus is configured to guide the end effector to the position of the first keypoint by moving the end effector to the first keypoint.

16. The device according to claim 9, wherein the processing apparatus is configured to generate training data for an artificial network comprising the annotated images.

17. A method for automated generation of ground-truth data for image annotation captured using a camera for training data of an artificial neural network, the camera being configured on a robot arm comprising an end effector, the method being performed by a processing apparatus operatively coupled to the camera and the robot arm, comprising:

operating the robot arm and camera system to determine a position and an orientation of the camera relative to the end effector;

selecting a first keypoint on the object;

providing information regarding additional keypoints relative to the first keypoint in object coordinates;

physically guiding the end effector to the position of the first keypoint;

determining the position and the orientation of the end effector at the first keypoint in world coordinates;

determining the position of the first keypoint in world coordinates;

determining the positions of the additional keypoints in world coordinates;

altering the position and/or the orientation of the end effector and capturing an image via the camera;

determining camera coordinates of the keypoints by converting the world coordinates of the keypoints into a camera coordinate system of the camera; and determining camera image coordinates of all keypoints for the training data using projection from the camera coordinates, whereby the images are annotated without requiring physical markers or manual identification of keypoints.

18. The method according to claim 17, wherein the providing of information regarding additional keypoints comprises measuring the respective positions of the additional keypoints with respect to the first keypoint at the object.

19. The method according to claim 17, wherein the providing of information regarding additional keypoints comprises utilizing existing information regarding dimensions of the object.

20. The method according to claim 17, wherein the guiding the end effector to the position of the first keypoint comprises manually moving the end effector to the first keypoint.

* * * * *